United States Patent [19]
Liu

[11] Patent Number: 5,392,410
[45] Date of Patent: Feb. 21, 1995

[54] HISTORY TABLE FOR PREDICTION OF VIRTUAL ADDRESS TRANSLATION FOR CACHE ACCESS

[75] Inventor: Lishing Liu, Pleasantville, N.Y.

[73] Assignee: International Business Machines Corporation, Armonk, N.Y.

[21] Appl. No.: 876,646

[22] Filed: Apr. 30, 1992

[51] Int. Cl.$^6$ .................... G06F 12/03; G06F 12/10
[52] U.S. Cl. ...................... 395/400; 395/425;
364/243.4; 364/243.41; 364/25; 364/253;
364/256.3; 364/256.4; 364/DIG. 1
[58] Field of Search ................. 395/400, 425

[56] References Cited

U.S. PATENT DOCUMENTS

| | | | |
|---|---|---|---|
| 5,099,415 | 3/1992 | Osler et al. | 395/400 |
| 5,148,538 | 9/1992 | Celtruda et al. | 395/425 |
| 5,168,557 | 12/1992 | Shibuya | 395/400 |
| 5,179,674 | 1/1993 | Williams et al. | 395/400 |
| 5,210,841 | 5/1993 | Johnson | 395/400 |
| 5,226,133 | 7/1993 | Taylor et al. | 395/400 |
| 5,235,697 | 8/1993 | Steely, Jr. et al. | 395/425 |
| 5,255,384 | 10/1993 | Sachs et al. | 395/400 |
| 5,305,444 | 4/1994 | Becker et al. | 395/400 |

OTHER PUBLICATIONS

J. H. Chang, H. Chao and K. So, "Cache Design of A Sub-Micron CMOS System/370", Proc. 14th Symposium on Computer Architecture, pp. 208-213 (1987).

*Primary Examiner*—Jack B. Harvey
*Assistant Examiner*—Michael A. Whitfield
*Attorney, Agent, or Firm*—Ronald L. Drumheller

[57] ABSTRACT

A 1-dimensional history table, which has been named a TLBLAT, is used to predict some or all of the real address bits that correspond to (i.e., translate from) any given virtual page address in order to provisionally access a real address based cache. The selection of a TLBLAT entry from given virtual address is based on certain address bits in the virtual address. The selection of a TLBLAT entry may also be based on the hashing of such virtual address bits together with other information in order to achieve sufficient randomization. At the minimum, each TLBLAT history table entry records the bits (one or more) necessary for prediction of the congruence class in a real address based cache. The set-associativity of the cache may be as low as one (i.e., a direct-mapped cache). More information may be included in each TLBLAT entry in order to facilitate various design considerations and it is possible even to combine a translation lookaside buffer (TLB) function with the TLBLAT function into a single physical table that provides the functions of both.

10 Claims, 6 Drawing Sheets

HISTORY TABLE FOR PREDICTION OF VIRTUAL ADDRESS TRANSLATION FOR CACHE ACCESS

This application relates to another application entitled HISTORY TABLE FOR SET PREDICTION FOR ACCESSING A SET-ASSOCIATIVE CACHE, Ser. No. 07/876,850, filed concurrently herewith by the same inventor and assigned to the same assignee as this application.

FIELD OF THE INVENTION

This invention generally relates to caches for computer systems having virtual addressing and more particularly to schemes for accessing real address based caches from a virtual address.

BACKGROUND OF THE INVENTION

The use of caches for performance improvement in computing systems is well known and extensively used. A cache is a high speed buffer which holds recently used memory data. Due to the locality of references by programs (i.e., the tendency for programs to reference locations in memory that have addresses which are close together), most of the accesses to memory data may be accomplished by access to a cache, in which case slower accessing to bulk memory can be avoided.

In a typical high performance processor design, the cache access path forms the critical path. That is, the cycle time of the processor is limited by how fast cache accesses can be carried out.

A cache may be viewed logically as a 1-dimensional or 2-dimensional table of data blocks or lines, in which each table entry stores a particular block or line of memory data. Hereinafter the term cache "line" will be used to refer to a cache data storage unit, but the term cache "block" is considered synonymous. The implementation of a cache is normally accomplished through three major functions: a directory function, a memory function (sometimes called the arrays) and a control function. The cache directory contains the address identifiers for the cache line entries, plus other necessary status tags suitable for particular implementations. The cache memory or arrays store the actual data bits (which may represent an operand or an instruction), plus additional bits for parity checking or for error correction as required in particular implementations. The cache control circuits provide necessary logic for management of the cache contents and accessing.

Upon an access to the cache, the directory is looked up to identify whether or not the desired data line resides in the cache. A cache hit results if the desired data line is found in the cache, and a cache miss results otherwise. Upon a cache hit, the data may be accessed from the array if there is no prohibiting condition (e.g., key protection violation).

Upon a cache miss, the data line is normally fetched from the bulk memory and gets inserted into the cache first, with the directory updated accordingly, in order to satisfy the access from the cache. Since a cache only has capacity for a limited number of line entries and it is relatively small compared with the bulk memory, replacement of existing line entries is often needed. The replacement of cache entries is normally based on an algorithm, such as the Least-Recently-Used (LRU) scheme. In the LRU scheme, when a cache line entry needs to be replaced, the line entry that was least recently accessed will be preferred for replacement.

In order to facilitate efficient implementations, a cache is normally structured as a 2-dimensional table 230 (see FIG. 1). The number of rows is called the set-associativity (i.e., 4-way set associative in FIG. 1), and each column is called a congruence class. For each data access, a congruence class is selected using certain memory address bits 112 of the access address 250, and the data may be accessed at one of the line entries 116a–d in the selected congruence class 116 if it hits there.

It is often considered too slow to have the cache directory searched first (even with parallel address compares) to identify the set position a, b, c or d (within the selected congruence class 116) and then have the data accessed from the arrays only at the identified location. Such sequential processing normally requires 2 successive machine cycles to perform, which degrades processor performance significantly. A popular approach instead, called *late-select*, achieves the directory search and array data accessing in one cycle as follows. Consider the fetch of a data unit (e.g., a doubleword) by an execution element. Without the knowledge of the exact set position For access, the array control retrieves candidate data units from lines at all set positions in the congruence class immediately, while the directory is looked up. Upon a cache hit, the directory control signals the final selection of one of those retrieved data units and sends it to the requesting execution element.

Another aspect that complicates cache design is the commonly employed virtual addressing architecture in almost all modern computer systems. In a virtual memory system (e.g., IBM/390 architecture) each user process may have the view of its own virtual address space. Upon execution of programs, the operating system dynamically allocates real memory pages (e.g., 4 kilobytes per page) to more actively accessed virtual address pages. When a page accessed from a program does not have a real memory page allocated for it, an exception (page fault) condition will occur and triggers the operating system to properly allocate a real memory page frame. Page fault processing is normally associated with a very high performance overhead and often requires data accessing from slower backing devices like disks. However, due to the a strong program locality characteristic, a reasonable operating system can maintain a very low page fault rate during program executions.

The operating system normally maintains the real page allocation information in architecturally specific software tables. Typically a 2-level translation table structure with segment and page tables is used for this purpose. Each program space has its own segment table, in which each entry points to a page table. At a page table, each entry records the real page allocation information, plus any status tags needed for a particular architecture. The operating system manages such translation tables according to its design algorithms.

One consequence of the employment of virtual addressing is that the same virtual page address from different program address spaces may not be logically related and allocated at different real page frames in the storage. Furthermore, in architectures like IBM/390, the same real page frame may be accessed through different virtual addresses from different programs or processors.

With all these architectural requirements, most systems require a step called *virtual address translation* for processing storage accesses from processors. Virtual address translation *translates* a virtual page address into a real page address. A page fault exception is triggered if the real page frame is not allocated, for which the operating system will update the translation information when allocation is complete and then allow the faulted program to resume execution.

In most modern systems hardware facilities are used for speeding up the virtual address translation process. Typically a Translation Lookaside Buffer (TLB) is employed for each processor. A TLB is a hardware directory table that records the translation information for a act of actively accessed virtual pages. Due to the program locality nature, a relatively small TLB (e.g., with 64-1024 page entries) can capture the translation information for a great majority (e.g., over 99.95%) of storage accesses from a processor. Only upon a TLB miss condition (i.e., when the TLB cannot cover the particular storage access) will a slower translation process (e.g., through microcode or operating systems code) be activated.

For efficiency of hardware implementation, a TLB is normally structured as a set-associative table like the cache directory. For a given virtual page address (including one or more program space identifiers), the hardware uses certain address bits (and other information specific to a particular design) to derive a congruence class. Within the TLB congruence class, the hardware performs a parallel search of the entries and identifies the results of translation if there is a hit.

In many processor designs a storage access needs to go through a TLB translation prior to the final resolution or cache access. For example, in the IBM/3090 system design, the TLB look-up is carried out in parallel with the cache directory search, with their results merged for final late-select of the array data. FIG. 2 depicts such a design. The address of the memory access requested by a processor I/E-unit is called a logical address. Depending upon the particular addressing mode (real or virtual) of the current processor status, the logical address can be a real address or a virtual address. For the same physical data, the congruence class selected through use of a real address can be different from the congruence class selected through use of a virtual address. Furthermore, in some architectures (e.g., IBM/390), the same physical memory page can be concurrently accessed through arbitrarily different virtual (page) addresses at different cache congruence classes. In the IBM/3090 system design, although cache lines are placed primarily based on the logical address bits of the processor access that caused the cache miss line fetch, many comparators are used for the directory search of each cache access in order to timely determine the possibility or cache hit(s) to various alternative cache locations.

This requirement for multiple directory searches for the resolution of cache accessing has been a source of complexity for the optimization of many cache designs. One approach for avoiding the synonymous ambiguity between virtual and real addresses is to supply only real addresses to the cache access control. Such an approach, however, normally requires an access to a TLB in order to retrieve translation information for any virtual address. On the other hand, accessing a TLB is usually a slower path. In modern computers relatively sizeable TLB's (e.g., with 256-1024 page entries) are used in order to obtain high hit ratios, and hence it is rather expensive and difficult to implement TLB's with fast circuits (e.g., using shift-register latches, or using ECL circuits in BiCMos designs). In addition, the size of TLBs often prevents the placing of the TLB physically close to the critical components in the cache access path and results in delays in signal passing. Consequently, the approach of only supplying real addresses for cache accessing is often prohibited in implementation due to constraints on critical path timing.

There have been many design proposals for implementating caches effectively. FIG. 3 outlines the IBM/3090 design of a 64 kilobyte (KB) processor cache for 31-bit logical addressing. This cache is 4-way set-associative with 128 congruence classes. The line size is 128 bytes. There is a cache directory 220, cache memory data arrays 230 and a 2-way set-associative TLB 210. The processor I/E-units and microcode issue a storage access by a *logical address*. The logical address 250 can be either virtual or real, depending upon the current mode of addressing at the processor.

The more complicated case for a doubleword (8 bytes) fetch request with a virtual address will be described. Seven bits 18-24 are used for selecting the congruence class. Of these seven bits, two bits 18 and 19 are part of the page address. It can happen that, due to unpredictable translation results, these two bits can get translated to 2 real address bits in any of the four possible combinations. Among the four congruence classes that may possibly contain the data line being accessed, the one determined by the address bits in the currently accessed logical address is called the *principal congruence class* (PCC), and the other three are called *synonym congruence classes*.

Although program locality will cause a great majority of cache accesses to hit the principal congruence class, there is still a chance that the accessed line might belong to one of the other (synonym) congruence classes. This is the so-called *synonym problem*.

In the IBM/3090 system design, the following steps are carried out in parallel:

1. Bits 18-31 of the logical access address are passed to the cache memory array control. Bits 18-24 are used to determine the principal cache congruence class. Then a doubleword (as indicated by bits 25-28) is read out of the cache arrays from each of the four line entries in the principal congruence class. These four doublewords will not be sent out to the requesting I/E-unit until a late-select signal is received.
2. Bits 18-24 are sent to the cache directory for lookup. Each directory entry records the real address for the associated line. All 16 directory entries or the principal and synonym congruence classes are read out.
3. Certain virtual address bits (not elaborated here) are used for the TLB to select the congruence class, from which the real address translation information of the 2 TLB entries are read out.

The 16 real line addresses read out of the cache directory are then merged with the 2 real addresses read out of the TLB for address match via 32 comparators. (There is other tag matching involved and not elaborated here.) When it is found that the translated address of the accessed line matches one of the cache directory real addresses, a cache hit condition results. Otherwise a cache miss occurs and triggers a cache miss routine. Upon a cache hit situation, the congruence class containing the line may or may not be the principal congruence class. The following then is carried out by the cache control:

Principal Congruence Class (PCC) Hit—A signal is sent to the late-select logic to gate the selected doubleword on a bus to the requesting I/E-unit. The access is complete.

Synonym Congruence Class Hit—Proper steps are taken to have the doubleword accessed from the synonym congruence class through later array fetching. This will result in longer delays to the access.

In a cache miss situation the cache control will request a copy of the line from main storage. When the line comes back it will be placed in an allocated cache entry in the principal congruence class.

A major complexity in the IBM/3090 cache design is associated with resolution of synonyms. The comparator component CMP 128 utilizes 32 comparators for a timely decision when there is a principal congruence class miss situation. The number of comparators will grow linearly to the number of congruence classes and the set-associativity of the TLB. For instance, if the cache size grows to 256K by quadrupling the number of congruence classes and if the set-associativity of the TLB increases to 4, the total number of comparators required in the CMP unit will increase to a rather impractical 256.

As discussed earlier, implementation of a real address based cache often suffers from the slow path of resolving real address translation through a TLB. A recently proposed approach For implementing a real-address based cache is the MRU-cache design described by J. H. Chang, H. Chao and K. So in "Cache Design of A Sub-Micron CMOS System/370," Proc. 14th Symposium on Computer Architecture, at pp. 208-213 (1987), which is depicted in FIG. 4.

In the MRU-cache design approach, upon a cache access with a virtual address, the selection of the real address congruence class is based on a certain prediction. The TLB is normally structured as a typical set-associative directory, in which replacements are managed on a per congruence class basis. For each virtual address, the associated congruence class in the TLB is determined by certain (typically higher order) bits in the page address portion. Within each congruence class, there is typically a most-recently-used (MRU) entry and a least-recently-used (LRU) entry as indicated by a replacement status tag. The LRU entry is the one chosen for replacement when a new page entry needs to be inserted into a congruence class. Due to the program locality characteristic, successive virtual addresses issued from the processor are likely to hit the MRU entries in TLB. The MRU-cache approach utilizes such locality behavior and predicts that the translation of a virtual address will be from the MRU entry in the associated congruence class of the TLB.

Key aspects of real address prediction in the MRU-cache approach are as follows. For a given virtual address issued for a cache access by the processor, the TLB congruence class is determined (via certain virtual page address bits) as usual, and the real page address bits associated with the MRU entry of the congruence class are read out as a prediction. Among the retrieved real address bits, certain bits necessary for determining the (real) cache congruence class are sent out to the cache array control for cache data retrieval. In the meantime the virtual address is compared with all the entries in the TLB congruence class as usual to precisely determine the actual translation results. Due to the high hit ratio on MRU entries in a TLB, the cache congruence class selections based on this prediction are most likely correct. Upon an incorrect prediction, as determined from TLB compares later during the cache access cycle, the current cache access is simply aborted and re-issued in a subsequent cycle. When a cache access is re-issued due to the incorrect prediction of the cache congruence class selection, the TLB can supply the correctly translated real bits for a correct cache congruence class selection.

Compared with conventional real address cache approaches, the MRU-cache approach allows slightly faster selection of cache congruence classes by not waiting for the final compare results from the TLB. However, the MRU-cache design suffers from the following drawbacks. First of all, the MRU-cache requires retrieval of real address bits from the TLB in the cache access critical path. Prior to the reading of such real address bits, the slow cache array access cannot be started.

One possible alternative approach in relieving this timing burden on the cache access cycle might be to move the reading of the TLB/MRU information to an earlier cycle (typically the logical address generation cycle). However, this would simply pass the timing problem on to the earlier cycle instead.

A second problem for the MRU-cache approach is related to the accuracy of prediction in certain designs. The accuracy of prediction relies on the probability of hits to MRU entries in the TLB for virtual addresses. Consider a TLB with 256 page entries. The miss ratio for the entire TLB could be significantly reduced (e.g., by over 20%) if the TLB set-associativity were to be increased from 2 to 4, particularly for programs which are causing severe congestion in a few TLB congruence classes. With a 4-way set-associative TLB there are only 64 MRU page entries. In a typical commercial workload the hit probability of operand accesses (fetches and stores) to these 64 MRU entries in the TLB is below 97.5%. Such a hit probability may be improved (e.g., to around 99%) when the TLB set-associativity decreases to 2, at the expense of more misses for the entire TLB.

It would be desirable to be able to obtain some or all of the real address bits for a virtual page address faster, more accurately and with more cache accessing flexibility than is provided with this MRU-cache approach.

DISCLOSURE OF THE INVENTION

It is therefore the object of the present invention to provide a faster and highly accurate mechanism for providing real address bits from a virtual address which allows more efficient and more flexible implementations of cache accessing.

These and further objects and features have been accomplished by using a proper history table to predict real address bits for cache accessing.

According to this invention, a 1-dimensional history table (which I have named a TLBLAT) is used to predict some or all of the real address bits for any given virtual page address. The selection of a TLBLAT entry for a given virtual address is based on certain address bits in the virtual address. The selection of a TLBLAT entry may also be based on the hashing of such virtual address bits together with other information in order to achieve sufficient randomization. At the minimum, each TLBLAT history table entry records the bits (one or more) necessary for prediction of the congruence class in a real address based cache. The set-associativity of the cache may be as low as one (i.e., a direct-mapped cache). More information may be included in each TLBLAT entry in order to facilitate various design considerations and it is possible even to combine a TLB and TLBLAT into a single physical table which provides the functions of both.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF PREFERRED EMBODIMENTS OF THE INVENTION

Figure 5:
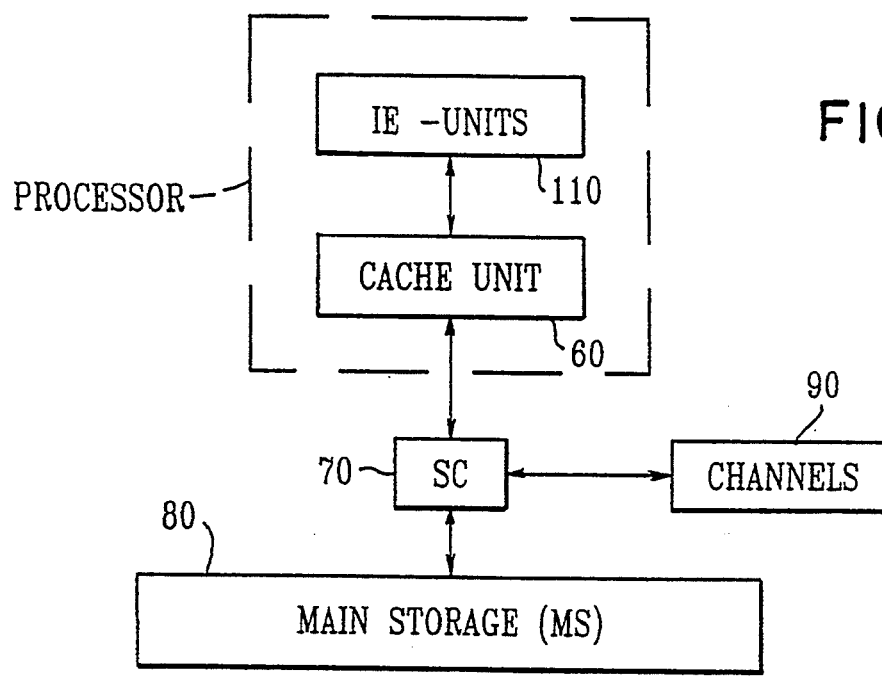
FIG. 5 is a block diagram illustrating the high level system organization of an embodiment of this invention.

Referring now to the drawings, and more particularly to FIG. 5, there is illustrated in block diagram form a system structure of the type in which the invention may be used. The processor comprises instruction and execution (IE) units 110 and a cache unit 60. Each IE includes hardware and microcode that issue instructions that require the fetching and storing of operands in main storage (MS) 140. A Storage controller (SC) 130 coordinates storage related activities requested by the processor or the I/O channels 150. For simplicity of description, it will be assumed that the IE-units 110 can issue at most one storage fetch or store request each cycle, and each storage request is within a doubleword (8 bytes) granule.

When the cache line that includes the doubleword requested by the IE units 110 resides in the cache unit 60, the condition is called a *cache hit*. Otherwise the condition is called a *cache miss*. Upon a cache miss, except for certain very special conditions, the cache unit 60 needs to request the line from MS 80 through the SC 70 first before satisfying the request from IE 110. The IE units 110 cooperatively support a processor pipeline. For the purpose of illustration, a processor pipeline is assumed to exist in which the major stages for the processing of an instruction are as follows:

1. Decode & Address Generation Stage—The instruction is decoded and the operand address(es) is generated (if necessary). For instance, the LOAD (L) instruction in the IBM/390 architecture causes a word (32 bits) to be loaded from a memory location into a general purpose register (GPR). The instruction itself (as specified in the program object code) is 4 bytes (32 bits) long. The first byte is the OPCODE identifying the instruction itself. There are two operands R1 and D2(B2,X2) specified in the next 3 bytes the instruction. R1 is a GPR that receives the memory word. D2(B2,X2) specifics a memory locations where the word data is to be loaded from. D2 is a 12-bit *displacement*, B2 is the *base register* and X2 is the *index* register. The logical address (virtual or real depending upon the current addressing mode of the execution) of the memory operand is formed as the sum of the D2 value (0–4095) and the contents of GPR's B2 and X2 (each GPR records 32-bits). Depending upon the particular instructions, there can be no memory operand or can be multiple memory operands.

2. Cache Access Stage—In this stage an operand address (if any) formed in the address generation phase in the previous stage is used to access (read or write) memory data from the cache. This stage may be repeated when necessary. Primarily the cache unit 60 is responsible for the operation of accessing the cache for this stage. The access address received by the cache unit 60 can be either logical or (always) real, depending upon the particular implementation.

3. Execution State—Most instructions (e.g., ADD) can be executed only when both required operands (if any) are available. In an ideal pipeline execution, each stage consumes just 1 machine cycle. However, there can be various delays (e.g., due to a cache miss) that may prolong the completion of particular stages during execution. Also, there can be various other operations not directly specified in the above skeleton of a pipeline. For instance, the fetching of instructions themselves (called I-fetches) is not described, although the accessing of instructions from a cache is similar to operand fetches.

Figure 6:
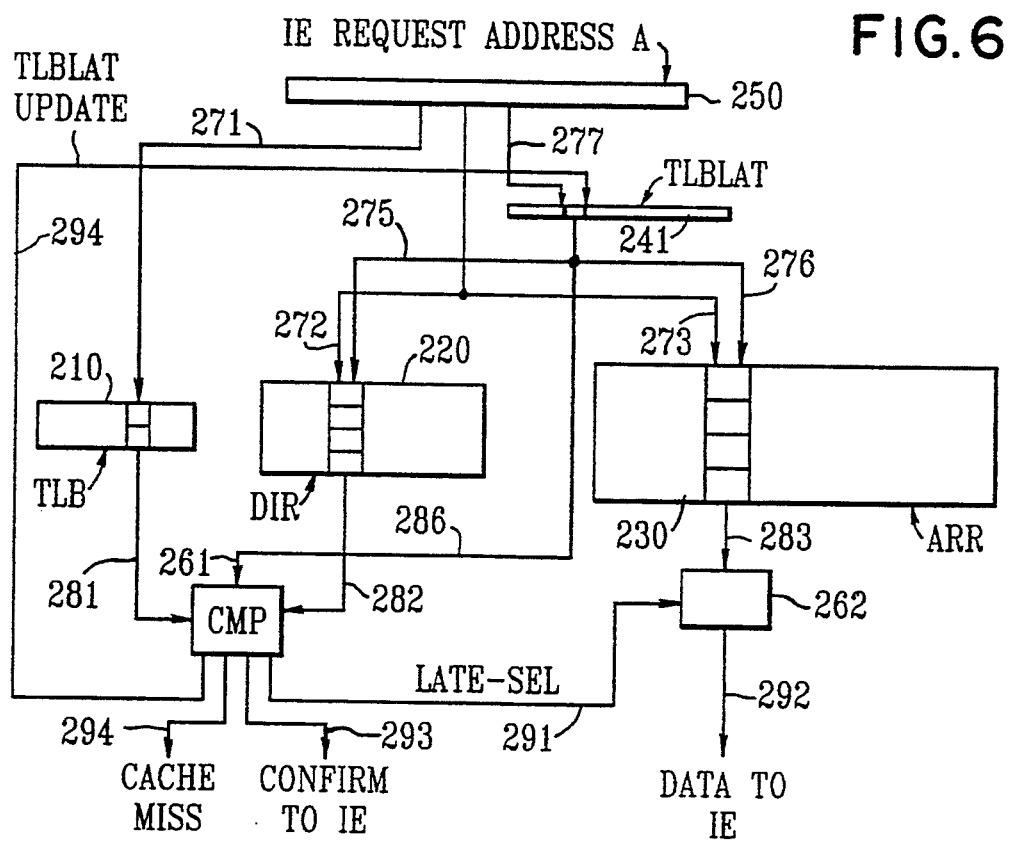
FIG. 6 is a block diagram illustrating a real address based cache design which incorporates a simple TLBLAT history table for fast resolution of congruence class selections in accordance with this invention.

FIG. 6 is a more detailed diagram of the cache unit 60. There are three major elements as in conventional cache units. TLB 210 is the translation lookaside buffer used for fast translations of virtual addresses to real addresses. DIR 220 is the cache directory that contains, for each line entry of the cache, the real address identification and other needed status tags. ARR 230 is the cache arrays or cache memory that hold the actual cache data bits, plus other bits necessary for parity checking or for error correction. For the purpose of illustration, a 4-way set-associative cache and a 2-way set-associative TLB are assumed. The cache has the total size of 128 kilobytes (KB), with 256 congruence classes and 128 bytes per line. The number of congruence classes in TLB 210 is not critical in the following description. TLBLAT 241 is a I-dimensional history table, which does not necessarily have the same number of entries as the number of congruence classes in TLB 210. Furthermore, it is assumed that the processor IE 110 accesses storage via 32-bit logical (virtual or real) addresses. The cache is a real address based cache. That is, when a physical line is inserted into the cache, the associated congruence class is determined solely by the real address bits of the line. For simplicity it is assumed that the congruence class selection for a cache line is determined by the lower order 8 bits in the real line address. Hence, for a given 32-bit real address (0–31), the associated cache congruence class is selected by address bits 17–24.

At the minimum, each entry of TLBLAT 241 contains the bits that are needed to resolve congruence class selections for the real address cache. For a given 32-bit logical address A 250 requested for storage access by the IE 110, let A[m-n] (where $0 \leq m \leq n \leq 31$) denote the address bits of A 250 in between and including the m-th and n-th bit positions. A[25–31] then represents the bit 25 through 31 of logical address A, which is the *line offset* address within the line boundary. A[20–31] is the *page offset* address within the page boundary, which will not be affected by translation (i.e., virtual equals real). Since there are 256 congruence classes, 8 bits of the line address A[0–24] are needed to select one of the 256 congruence classes for data access. If A[17–24] are picked to select the congruence class, the 3 bits A[17–19] can however be translated into any of the eight combinations for 3 real address bits. In this example, each TLBLAT 241 entry will contain (at least) 3 bits recording the history of the real address bits 17–19 of a previous translation. For example, For a TLBLAT 241 with 64 entries, 3-bits of the entry (denoted TLBLAT[A]) indexed by A[14–19] will be the predicted real translation for A[17–19]. In which case, these 3 bits at TLBLAT[A] will be concatenated with A[20–24] to select one of the 256 cache congruence classes for access.

Now consider the execution flow upon a cache fetch access from IE 110 with a virtual address A 250 in FIG. 6. The following occurs in parallel first:
1. Proper bits of A 250 are sent via path 271 to TLB 210 to read out the two entries in TLB 210 which are in the TLB congruence class defined by these bits. The output 281 is sent to the compare unit CMP 261.
2. Proper bits of A 250 are sent via path 277 to the control of TLBLAT 241 to select the 3 bits in TLBLAT[A] needed for prediction of a real address congruence class for the cache. The 3-bit TLBLAT[A] output is sent to the controls of CMP 261, DIR 220 and ARR 230.
3. Proper bits of A 250 (e.g., A[20–24] in the above example) are sent to the controls of DIR 220 and ARR 230. These address bits (within the page boundary), concatenated with the 3 output bits from the TLBLAT, will define a predicted congruence class of the cache. When this congruence class information is ready, the following will be carried out: a) The four DIR entries at the predicted congruence class will be read out via path 282 to CMP 261, and b) Four doublewords are read out of ARR 230 and sent via path 283 to the late-select unit 262.

Figure 1:
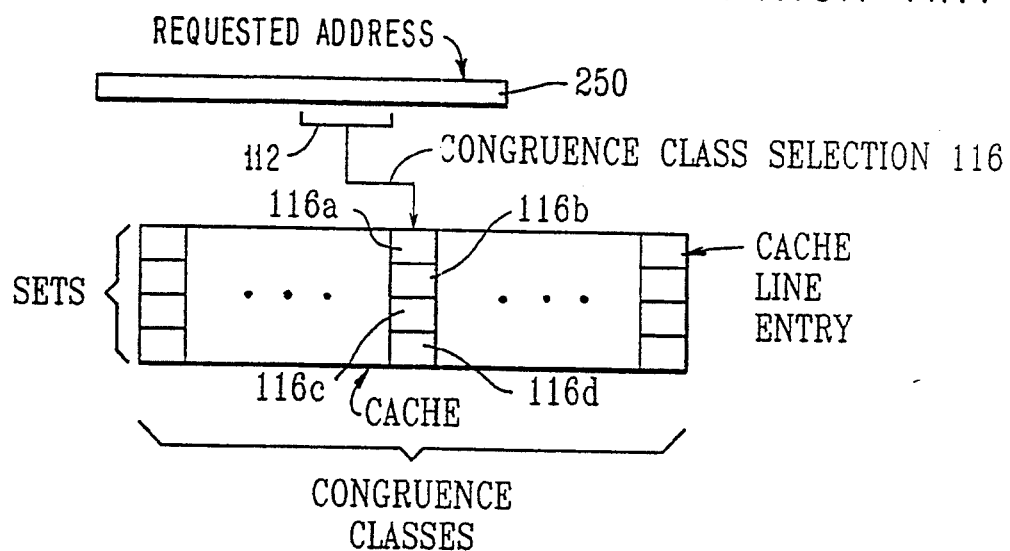
FIG. 1 is a block diagram showing the 2-dimensional structure or a typical cache.
Figure 2:
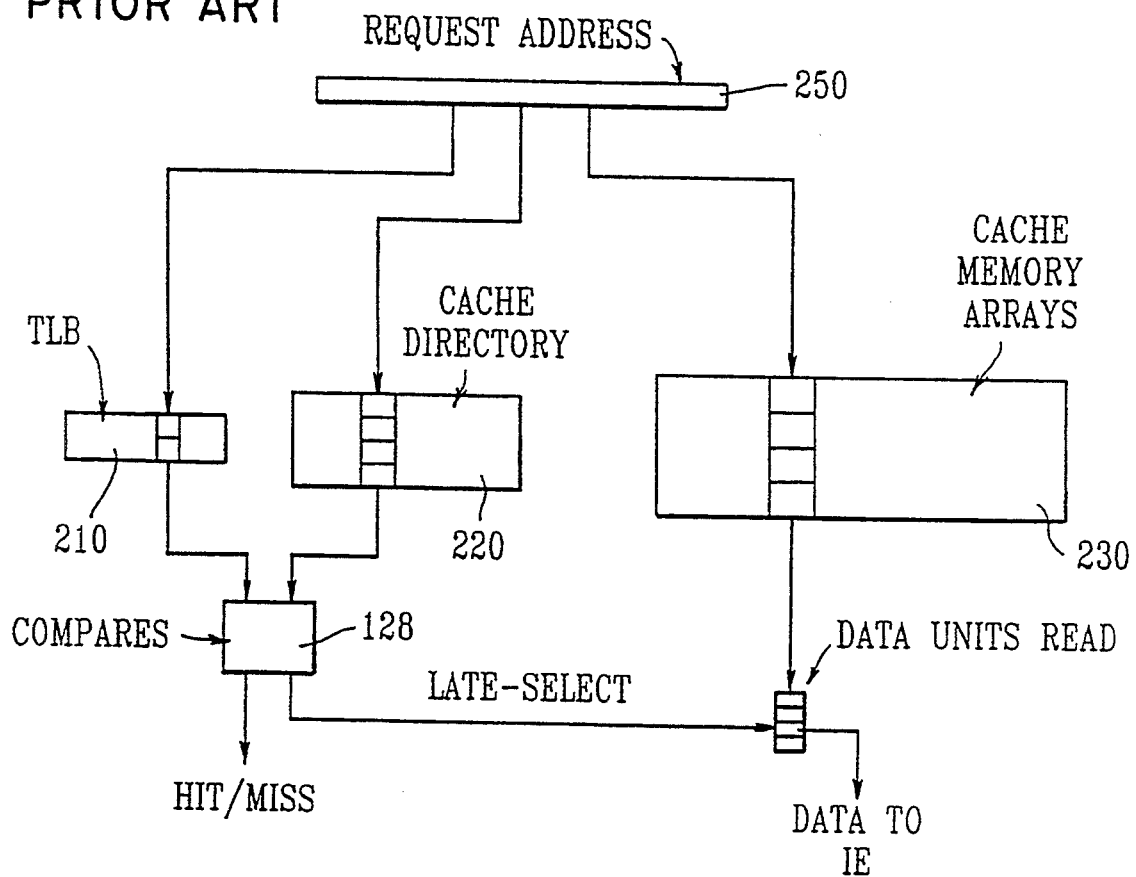
FIG. 2 is a block diagram of a prior art method illustrating the operations of reading TLB and cache directory entries, address compares, array data reading, and the late select of data.
Figure 3:
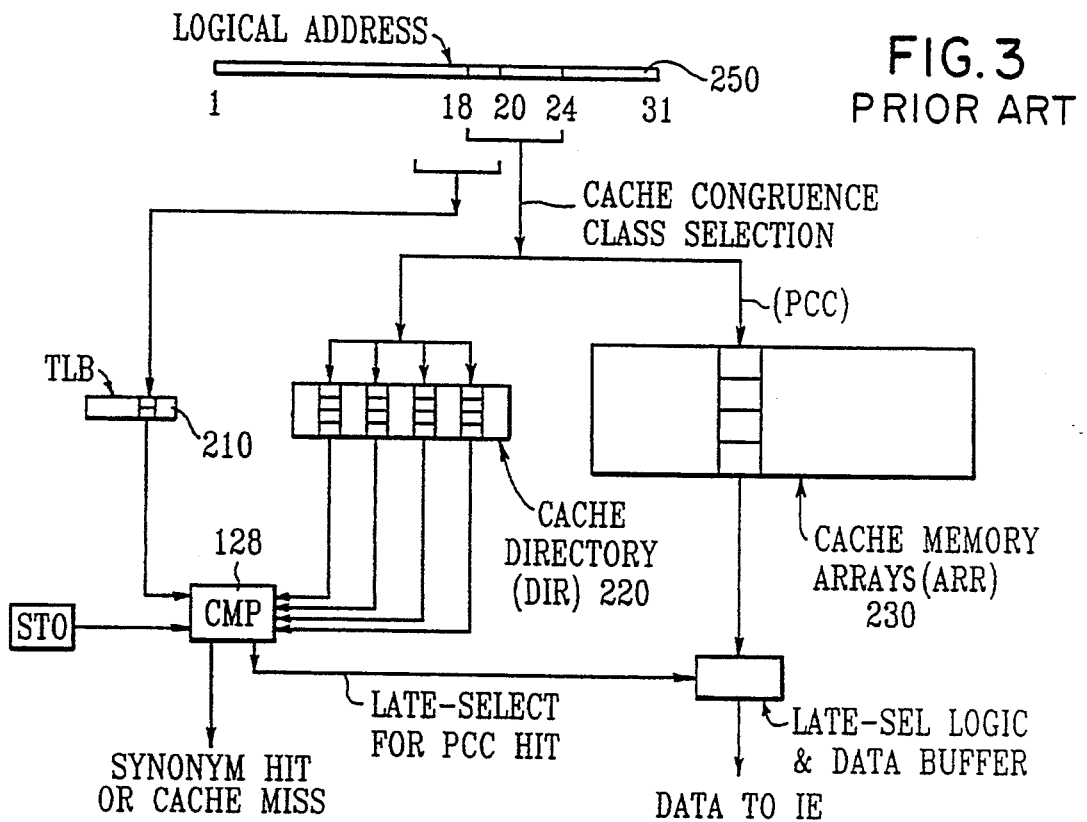
FIG. 3 is a block diagram of the IBM/3090 cache design.
Figure 4:
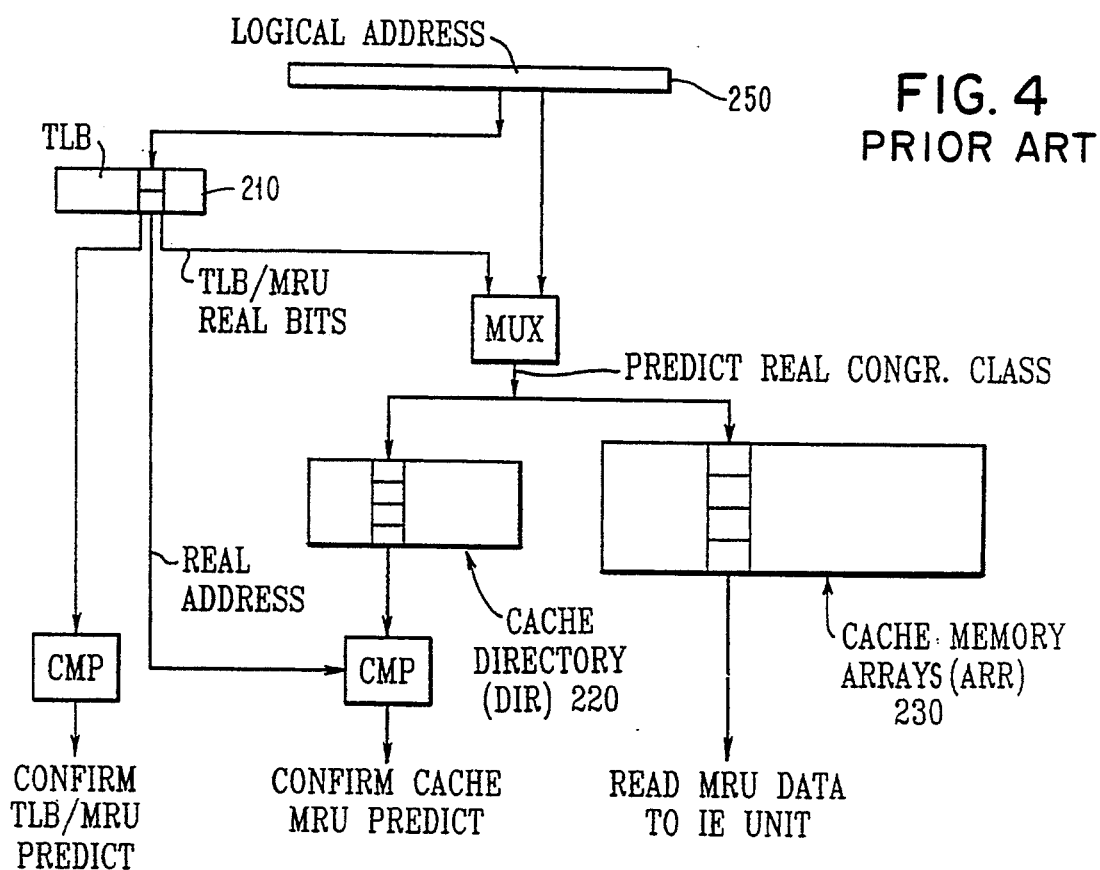
FIG. 4 is a block diagram illustrating the prior art MRU-cache design.

The circuitry of CMP 261 performs the following major functions. These functions are similar to those described for the CMP earlier, but with some modifications.
1. Detect the TLB hit or miss condition and verify the TLBLAT[A] 3-bit prediction received via path 286. The TLB hit/miss condition can be determined with standard comparators as in the IBM/3090 design (see FIG. 3). The verification of the TLBLAT[A] prediction is achieved by embedding the TLBLAT[A] (3-bits) into these enhanced comparators. The prediction is determined as correct if it matches the real address bits 17–19 of the TLB entry that the virtual address A hits, and is determined as incorrect otherwise. A TLB miss condition is raised when CMP 261 fails to find an entry in TLB 210 that matches the virtual page address of A 250 (and the STO), in which case a translation process is triggered to have the desired translation information inserted at a new entry of TLB 210. For the purpose of this invention, the details of TLB miss handling may be ignored and it may be assumed simply that the translation entry for a virtual address is always found in TLB 210.
2. Detect cache hit/miss condition—The cache hit or miss condition can be determined with pair-wise compares (matching real addresses from DIR 220 with real addresses derived from the TLB entries) in similar but simpler manner than in the IBM 3090 design shown in FIG. 3. The simplification comes from the reduced number of comparators needed, since no synonym congruence classes are involved. In this design only 8 comparators are required to pair-wise match the 4 real line addresses from DIR 220 with the 2 real page addresses from TLB 210. The late-select signal 291 indicates to the late-select unit. 262 which one (if any) of the 4 doublewords read out of the cache memory 230 is to be sent back to the IE 110. (In typical cache implementations like the IBM/3090, a 4-bit vector is sent as a late-select signal 291. At most one bit can be ON in the vector.)

Note that, in the 2nd step above, it can happen that a real line address match is found for an entry in DIR 220 at CMP 261 while the congruence class itself was predicted incorrectly. In this case the late-selected output 292 to IE 110 should be regarded as invalid. In FIG. 6, CMP 261 also outputs a confirmation signal 293 (e.g., single bit) to IE 110 indicating whether valid data is to be received. Depending upon the particular implementation, it might not be necessary to have a separate confirmation signal 293 as described. For instance, in many designs the late-select unit 262 will supply a data-ready signal to IE 110 indicating whether a late-selected doubleword is being sent out. In such a design, the confirmation signal 293 may be unnecessary, since it can either be AND'ed with all late-select bits 291 or AND'ed with the data-ready signal itself.

In FIG. 6, CMP 261 also produces a signal 294 indicating a cache miss condition when appropriate. A cache miss condition is raised when the cache congruence class prediction is correct but the 8 pair-wise address compares between TLB and directory real addresses fail to locate a match. When the signal line 294 is raised, proper cache miss actions are triggered to bring a copy of the desired line into cache unit 230 from MS 80. Cache miss handling has been widely practiced and is not critical to the current invention, so further detail about cache miss handling need not be described.

What remains to be described is the situation in which CMP 261 detects that the 3-bit prediction TLBLAT[A] is incorrect. This condition will trigger re-access to the cache for the request and an update of the TLBLAT 241 history information in subsequent cycle(s). In a simple approach, the re-access to the cache may be re-issued by the IE 110 in the subsequent cycle, as triggered by, say, a special status bit in the confirmation signal 293. Another approach is to have the cache unit 60 itself resolve the re-access while the IE 110 is in an access-pending state.

An update of TLBLAT 241 is triggered by signal 294, which provides the correct real bits (17-19) for the entry TLBLAT[A]. In an ideal case both cache re-access and TLBLAT update are carried out during the immediately following cycle. However, if the re-access to the cache still follows the data flow of FIG. 6 requiring the reading of TLBLAT 241 first, it will require two-ported type circuits for TLBLAT 241 in order to allow the update before the reading on timely basis.

Figure 7:
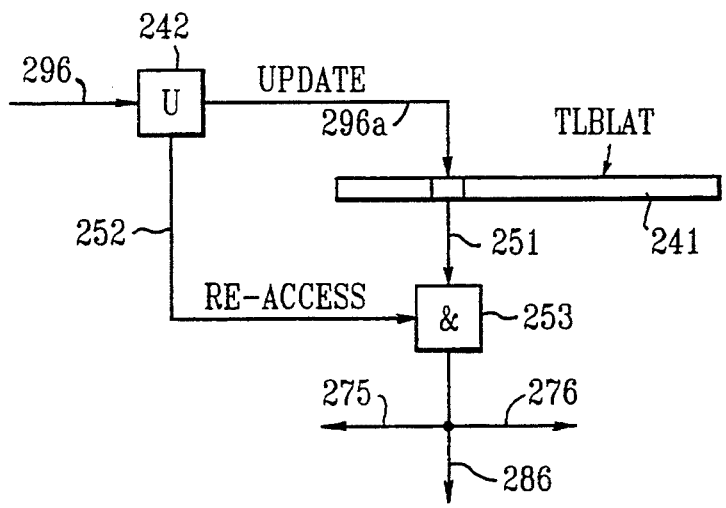
FIG. 7 is a block diagram illustrating how the reading and writing of a TLBLAT may be separated during history update, without requiring a dual-port capability for the TLBLAT.

One approach for avoiding such a requirement of being able to both write and read TLBLAT 241 in the same cycle is to bypass TLBLAT 241 reading upon cache re-accessing. FIG. 7 illustrates a possible control circuitry for TLBLAT 241 for this purpose. Upon an incorrect prediction, the correct three real address bits (plus other needed tags) for a TLBLAT 241 update are latched into a register U 242 at the TLBLAT control. The TLBLAT control has priority logic for deciding whether to read or write TLBLAT 241 in the, current cycle. During a TLBLAT update phase, the new 3-bits are input from U 242 to TLBLAT 241 via path 296a. During a TLBLAT read phase, the output bits are sent via path 251 through AND-gates 253 before being dispatched to the receiving units. The AND-gates 253 do logical ANDing of outputs from U 242 and TLBLAT 241. During a TLBLAT update phase, output 251 is kept as all 1-bits. During a TLBLAT read phase, output 252 is kept as all 1-bits.

A particular implementation may choose to carry out prediction from a TLBLAT in a cycle (e.g., logical address generation cycle) earlier than the cache directory/access cycle. In such a case, the timing requirement for TLBLAT 241 access can be relaxed.

The data flow for cache fetch accessing from virtual address has been described. In real addressing mode, the IE 110 issues a cache access through a real address directly. In this case, the above described operations related to TLB lookup and TLBLAT prediction can be ignored (bypassed) as is done with only the TLB lookup in conventional system designs.

Figure 8:
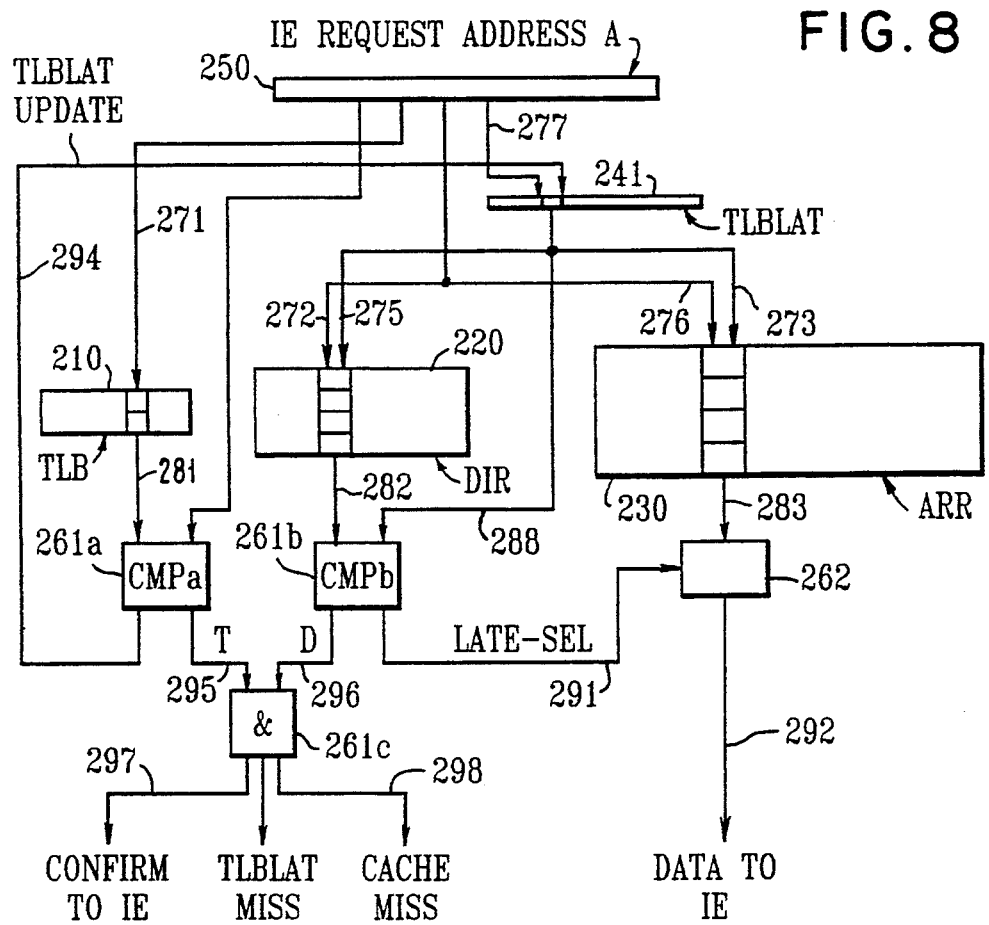
FIG. 8 is a block diagram illustrating a modification to the design of FIG. 6 in which the TLBLAT has been enhanced so that each TLBLAT entry contains all of the real page address bits.

The minimum requirement is for TLBLAT 241 to carry at each entry just those bits (e.g., 3-bits in the above described embodiment with 256 congruence classes) needed to resolve the real address congruence class selection. In certain designs, however, it may be beneficial to record more information at each TLBLAT 241 entry. One example is to record at each TLBLAT 241 entry the full real page address instead of only a portion (say only 3 bits). That is, TLBLAT[A] could contain the full real page address bits 0-19 for the previous TLB translation recorded in that particular entry of the TLBLAT 241. FIG. 8 depicts a design modification to FIG. 6 utilizing full real page address predictions.

In FIG. 8 the output TLBLAT[A] from TLBLAT 241 (which is passed via path 275 to DIR 220) is a predicted full real page address (i.e., bits 0-19). As for FIG. 6, the last three bits (17-19) of the prediction, concatenated with address bits 20-24 from A 250, are used to determine the predicted congruence class for the access. In FIG. 8, however, compare unit CMP 261 of FIG. 6 is broken instead into two parts: CMPa 261a and CMPb 261b. CMPa 261a now handles the detection of TLB hit/miss and corrections of histories at TLBLAT 241. CMPb 261b now handles only the DIR-search.

1. CMPa 261a takes inputs 281 from TLB 210, and also receives necessary virtual page address information (including the STO for an IBM/390 architecture) from A 250. With these inputs, CMPa can determine whether the virtual address hits in the TLB 210, and if so at which entry of the TLB 210 it hits. TLB 210 has been enhanced as well with information indicating whether each of its entries has a real address recorded at the corresponding entry (TLBLAT[A]) in TLBLAT 241. With this enhanced information, CMPa 261a can determine, for a TLB hit, whether TLBLAT[A] contains the real page address for A 250. If there is a TLB hit, CMPa 261a outputs a positive signal via line 295 (e.g., 1-bit T=1) to unit 261c, and outputs a negative signal on line 295 (e.g., 1-bit T=0) otherwise. In the event that an erroneous prediction by TLBLAT 241 is detected, the correct TLBLAT[A] value is sent for history update along the TLBLAT update line 294.

2. CMPb 261b compares bits 0-16 of the TLBLAT[A] (received along path 288) with the real line address (bits 0-16) read out via path 282 of each of the 4 line entries of DIR 220 in the congruence class determined by bits 17-19 of TLBLAT[A] and bits 20-24 of A 250), A late-select signal 291 is sent to unit 262 in accordance with the result of the directory matching at CMPb 261b. If an address match at an entry in DIR 220 is found, a signal 295 (e.g., 1-bit D=1) is sent to unit 261c, and a negative signal (e.g., 1-bit D=0) is sent otherwise.

3. The logic at unit 261c merges results from CMPa 251a and CMPb 261b and sends a proper confirmation signal to the IE 110. The data received by the IE 110 via path 292 is valid only when both inputs T (from CMPa) and D (from CMPb) are positive. Hence the confirmation signal 297 to IE 110 may simply be the bit value T&D. A cache miss condition is raised on line 298 by logic unit 261c when the TLBLAT[A] prediction is correct but the directory search at CMPb 261b finds no address match (i.e., when T=1 for signal 295 and D=0 for signal 295). When a T=0 signal 295 is received from CMPa 251a, the logic 261c raises a condition of wrong prediction for TLBLAT[A], which triggers a history update at TLBLAT 241 and re-access of the data as described for FIG. 6. Compared with the approach of FIG. 6, one possible advantage of this alternative approach is the avoidance of merging data from both TLB 210 and DIR 220 directly for compares (as was done at CMP 261 of FIG. 6). This may allow a physically partitioned design more easily. The cache directory search is separated from the TLB lookup, at the expense of more history bits at TLBLAT 241.

In the FIG. 8 embodiment, a tagging scheme was assumed for TLB 210 to recognize whether its entries have corresponding coverage at TLBLAT 241. This may be achieved in various ways. For example, TLBLAT 241 could be maintained as a subset of TLB 210. Each TLB 210 entry would be enhanced with a special bit L indicating its coverage at TLBLAT 241. When a virtual page entry is first created at TLB 210 (e.g., via replacement of an old entry) the associated L-bit is turned OFF (to 0). The L-bit of an entry at TLB 210 is turned ON (to 1) when the real address bits are updated to TLBLAT 241 (at the entry associated with the virtual page address).

However, there is still a possibility that a TLBLAT entry is updated by a TLB entry different from the one that set its old value. Hence, whenever a TLBLAT 241 entry is updated, it is necessary to turn OFF the L-bit at the TLB entry that set the value previously. This procedure might be facilitated with various simple TLB/TLBLAT entry selection algorithms. For example, consider a design in which TLB 210 has 128 congruence classes and 4-way set-associativity, and TLBLAT 241 has 256 entries. For any given virtual address A 250, seven address bits A[13-19] are used for the selection of congruence classes at TLB 210, and eight address bits A[12-19] are used for the selection of an entry in TLBLAT 241. Therefore, each entry in TLBLAT 241 can only be updated by pages recorded in a single congruence class of TLB 210. Consequently, when a TLBLAT 241 carry is updated from an entry in TLB 210, it is only necessary to look within the same congruence class of TLB 210 for a (possible) page entry with L=1 that is associated with the same TLBLAT 241 entry (i.e., with same virtual address bit b12).

Figure 9:
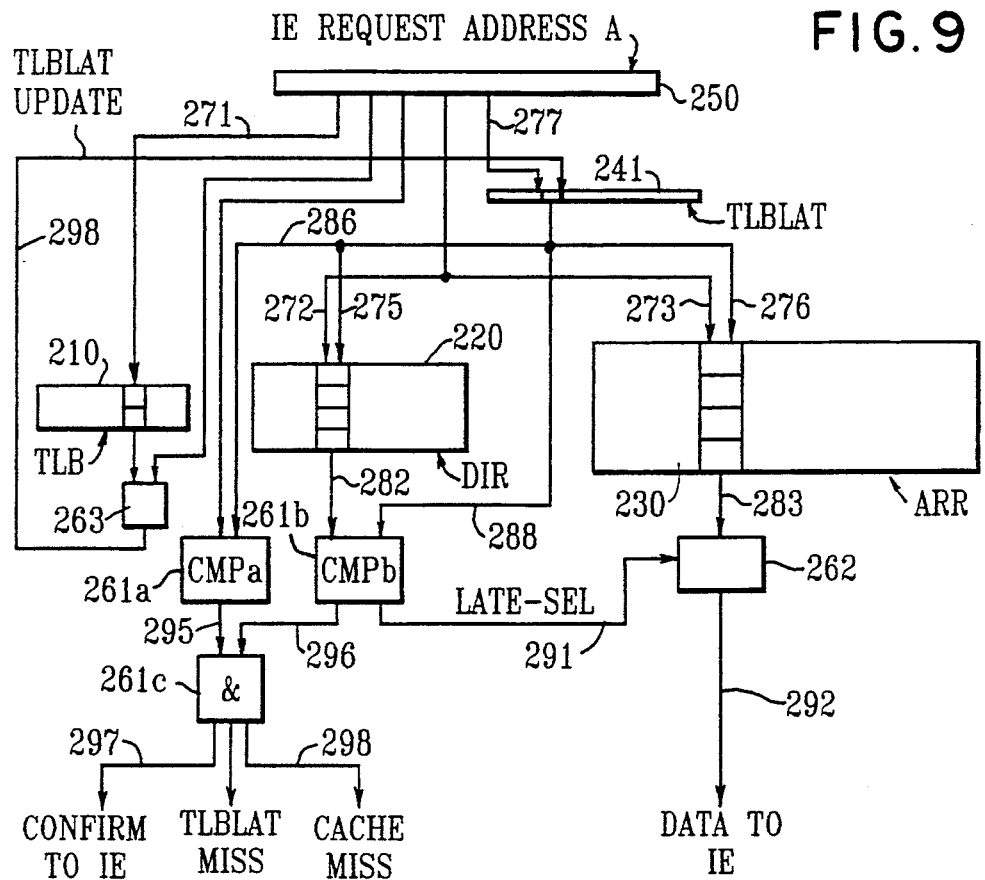
FIG. 9 is a block diagram illustrating a modification to the design of FIG. 8 in which the TLBLAT has been further enhanced to merge a TLB function with it and provide a full virtual address translation capability.

Yet another possible enhancement to the design of FIG. 8 is to include virtual address information (including the STO for an IBM/390 architecture) in the TLBLAT entry. In this way TLBLAT 241 can act also as a 1-dimensional full-function translation table, which may be maintained as a subset of the usual TLB 210. FIG. 9 depicts such a modification to the FIG. 8 embodiment utilizing a full-function TLBLAT 241.

In FIG. 9, CMPa 261a takes translation information from TLBLAT 241 directly, instead of from the bigger TLB 210. In this embodiment, TLBLAT 241 not only implements the real address prediction function for early cache access before translation of the virtual address in accordance with this invention, but it also implements the table portion of a small conventional TLB as well. TLB 210 in FIG. 9 now only serves the purpose of feeding TLBLAT 241 with translation information (via line 298 from a separate compare unit 263) when needed. It is a design choice whether or not to invoke a search of TLB 210 immediately for each access or to invoke such a full table TLB search only when TLBLAT 241 misses. In the FIG. 9 embodiment, there is actually a two level TLB implementation with the smaller TLB table function being implemented using the same table 241 that is used to implement the real bit prediction function of this invention.

In describing the above embodiments, only the fetch (read) access storage request has been described in detail. It is assumed that operand store (write) requests from IE-units are handled in a conventional manner, such as by utilizing the conventional deferred store approach, as implemented in IBM/3090 systems. With the deferred store approach, an operand store from an execution unit is first latched into a register and waits for the cache directory address compare results e.g., cache hit/miss, protection key violation, etc.). After the directory results are known without complications, the store can then be putaway to the cache arrays in a later cycle. This deferred store mechanism significantly simplifies the handling of operand stores when predictions in accordance with this invention are involved in cache accessing, since the cache directory search can precisely identify the location at which the store could possibly be put away. In this way the actual data putaway to arrays will not be complicated by erroneous predictions.

In the described embodiments, a late-select mechanism has been assumed. In certain designs, such a late-select may not be required. A typical example is the direct-mapped (or, 1-way set-associative) cache design. With a direct-mapped cache design, as long as the congruence class is determined, there is only a single line carry to choose for access. In the case of a cache miss, the old line is replaced by the new one. Although a direct-mapped cache suffers from a higher miss ratio, compared with a set-associative cache of equivalent total size, it does provide simplicity in implementation. For instance, late-select is not necessary. As soon as the congruence class is determined, a cache fetch access can read the data unit From the line entry and send it to the IE-unit directly. What the directory compare does is to identify the cache hit/miss condition and signals the requesting IE-unit accordingly.

Figure 10:
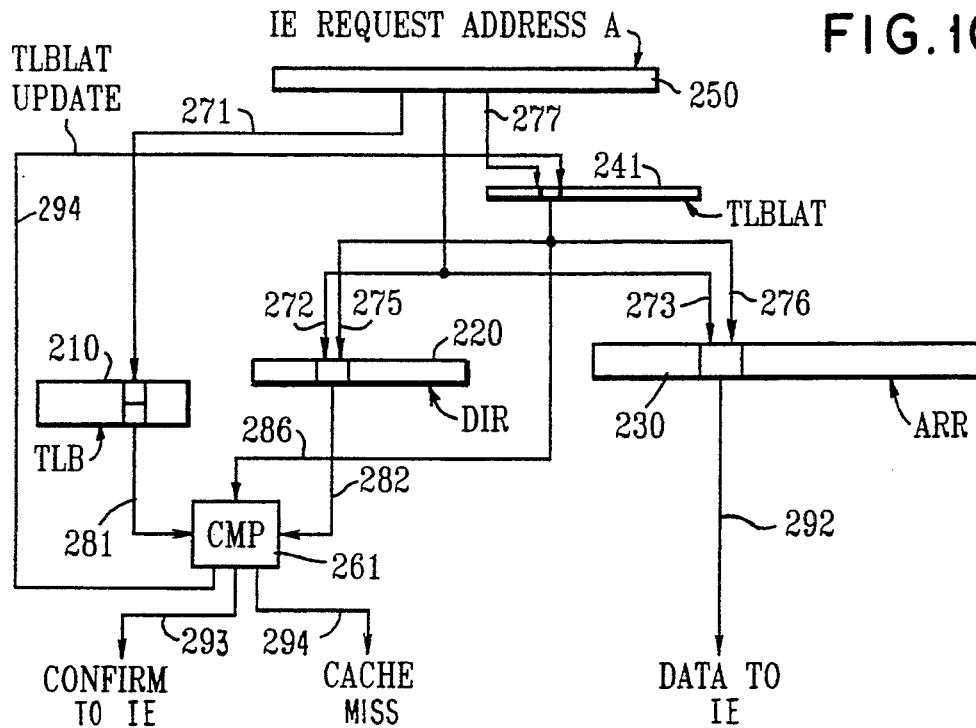
FIG. 10 is a block diagram illustrating another modification to the design of FIG. 6 for a direct-mapped cache application of this invention.

However, a direct-mapped cache can still encounter synonym problem. For instance, consider a real-address based direct-mapped cache with 128 bytes per line and with 256 congruence classes. This is essentially the cache in FIG. 6 with set-associativity reduced from 4 to 1. For any given virtual address from an IE-unit, the real address bits 17-19 still need to be resolved as before. FIG. 10 depicts a design for such a direct-mapped cache utilizing TLBLAT predictions.

FIG. 10 is a modification to FIG. 6. DIR 220 and ARR 230 are both flattened to 1-dimensional tables to represent the direct-mapped structure. The late-select signal line 291 (from CMP 261) and the late-select unit 262 in FIG. 6 are eliminated. FIG. 10 illustrates an extremely simple cache design which can be very effective in many systems. The advantage of using TLBLAT 241 is to implement a synonym-free real address based cache, without the timing overhead due to serial translation through TLB 210.

Figure 11A:
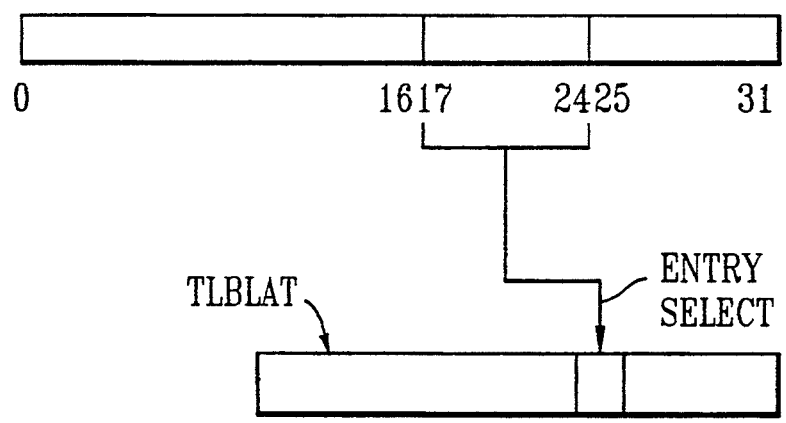
FIG. 11A is a block diagram of a simple technique for the selection of entries in a TLBLAT history table.
Figure 11B:
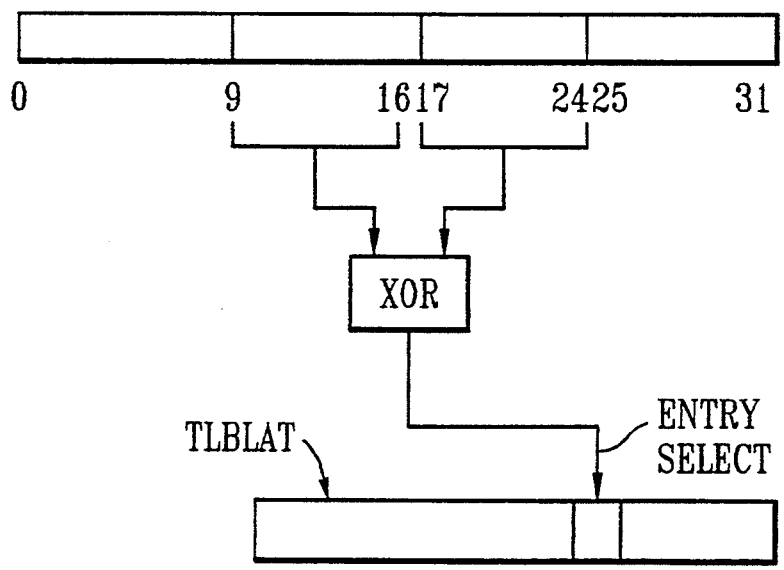
FIG. 11B is a block diagram illustrating a randomization technique for the selection of entries in a TLBLAT history table.

In the described embodiments, the selection of the history entry from TLBLAT 241 is based on certain fixed virtual address bits. Generally it is desirable to randomize the selection of such entries so that different virtual addresses do not collide at the same history entry as easily. FIG. 11A illustrates the straightforward selection scheme described earlier in which the 8 lower order virtual page address bits (17-24) are used directly to select the TLBLAT entry. FIG. 11B depicts a slightly more sophisticated approach, in which virtual address bits 17-24 are XOR'ed with bits 9-16 to produce the final eight bits for congruence class selection.

Whenever appropriate, information other than virtual address bits may be incorporated in the history entry selection scheme. For instance, in the IBM/390 architecture, the address space of each user (or program space) is identified by the STO (Segment Table Origin), which is the beginning address of the Segment Table in real storage. The selection of the TLBLAT entry could be achieved, for example, From a value obtained by hashing certain bits from the virtual address itself and certain bits from the STO representation in the machine. Obviously, whatever technique is selected for accessing the TLBLAT to read out real bits for a cache access must be used as well for accessing the TLBLAT to store correct historical values of real bits when the TLBLAT misses a prediction.

Although in the described embodiments, a single copy of a TLBLAT history table was presented in the illustrations, such tables may be replicated whenever implementation considerations makes it beneficial to do so Although the current invention has been illustrated for a single processor cache in the above embodiments, the described techniques can clearly be applied to other types of processor cache organizations. They can be applied, for example, to the well-known I/D-split cache organization, in which an I-cache is used only for instruction fetching, and a separate D-cache is used for operand data accessing (reading or writing). The techniques for predicting translation informally applied to an I-cache and a D-cache independently. From simulation studies it was found that instruction fetching has a stronger locality behavior than operand accesses do. Hence a smaller TLBLAT might be used for I-cache accesses and a bigger TLBLAT might be used for D-cache accesses.

One major benefit of using the TLBLAT facility is the reduced complexity of obtaining translation information in implementation. For example, the described TLBLAT with 256 entries and 3 bits per entry results in a rather small table (with fewer than 800 bits), but it can provide a very highly accurate prediction of the real address. The small size of the TLBLAT table offers various possibilities for creating more efficient implementations. For instance, it is possible to employ faster circuits for the TLBLAT so that reads and writes can be carried out more quickly. Also, the table can be physically placed rather close to the critical path for cache accessing in order to reduce signal delays.

In hardware designs parity bits and/or error correcting codes (ECC's) are often used for the detection and correction of transient errors. There is no inherent requirement to add such protection to TLBLAT contents in most implementations, since such history information is used only for prediction and is subject to immediate verification. However, parity and/or ECC bits could still be desirable for RAS (reliability, availability and serviceability) reasons.

In the described embodiments, the methods for predicting virtual address translation information have been applied to implementations of cache accessing in order to make cache accessing more efficient. Such prediction techniques should also be useful for other design purposes when faster acquisition of real address bits is beneficial.

While the invention has been described in terms of a preferred embodiment, those skilled in the art will recognize that the invention can be practiced with modification within the spirit and scope of the appended claims.

Having thus described my invention, what I claim as new and desire to secure by Letters Patent is as follows:

1. An apparatus for faster data access in a computer system from a virtual address, comprising:
   a cache memory for storing data lines, each of said data lines stored in said cache memory being stored and accessed in accordance with a subset of real address bits from a real address of said each data line, said subset of real address bits including at least one real address bit that is translated when a real address is generated from a corresponding virtual address;
   a cache directory for storing a real address corresponding to said each data line stored in said cache memory;
   a history table for predicting said at least one real address bit from a virtual address for a desired data line before completion of actual translation of said virtual address for said desired data line to a corresponding real address for said data line;
   cache memory accessing control means responsive to said at least one predicted real address bit from said history table for provisionally outputting from said cache memory at least one data line that corresponds to said at least one predicted real address bit;
   address translation means for generating a true real address that actually corresponds to said virtual address; and
   verification means for comparing said true real address with said stored real address corresponding to each of said at least one data line.

2. An apparatus as defined in claim 1 wherein said history table comprises a plurality of entries, each of said entries being accessed using a predetermined subset of virtual address bits.

3. An apparatus as defined in claim 2 wherein any virtual address corresponds to one and only one of said entries.

4. An apparatus as defined in claim 2 wherein each of said entries includes said at least one address bit.

5. An apparatus as defined in claim 4 wherein each of said entries includes a real page address, said real page address in said each entry being a real page address corresponding to a most recent virtual address used to access said each entry.

6. An apparatus as defined in claim 5 wherein each of said entries further include said most recent virtual address.

7. An apparatus as defined in claim 2 wherein said entries in said history table are randomized with respect to a subset of virtual address bits used to access said history table.

8. An apparatus as defined in claim 2 wherein each said history table entry contains information sufficient to provide a translation of a virtual address used to access said each entry to a real address corresponding thereto whenever said virtual address used to access said each entry is identical to a most recent virtual address used to access said each entry.

9. An apparatus as defined in claim 1 wherein said cache memory has a direct-mapped cache organization.

10. An apparatus as defined in claim 1 wherein said cache memory has a set-associative cache organization.

* * * * *